(12) United States Patent
Day et al.

(10) Patent No.: US 10,626,789 B2
(45) Date of Patent: Apr. 21, 2020

(54) TWO-STAGE VALVE ASSEMBLY FOR TURBOCHARGER

(71) Applicant: BORGWARNER INC., Auburn Hills, MI (US)

(72) Inventors: Andrew Paul Day, Huddersfield (GB); Mark Burgess, Lincolnshire (GB)

(73) Assignee: BorgWarner Inc., Auburn Hills, MI (US)

( * ) Notice: Subject to any disclaimer, the term of this patent is extended or adjusted under 35 U.S.C. 154(b) by 65 days.

(21) Appl. No.: 15/881,102

(22) Filed: Jan. 26, 2018

(65) Prior Publication Data

US 2019/0234296 A1    Aug. 1, 2019

(51) Int. Cl.
*F02B 37/18* (2006.01)
*F16K 1/20* (2006.01)
(Continued)

(52) U.S. Cl.
CPC ............ *F02B 37/186* (2013.01); *F02B 37/18* (2013.01); *F02B 37/183* (2013.01);
(Continued)

(58) Field of Classification Search
CPC ...... F02B 37/186; F02B 37/18; F02B 37/183; F16K 1/443; F05B 2220/40;
(Continued)

(56) References Cited

U.S. PATENT DOCUMENTS

| 27,909 A | 4/1860 | Jeffers |
| 2,102,846 A * | 12/1937 | Hunt ...................... F02D 9/102 261/39.3 |

(Continued)

FOREIGN PATENT DOCUMENTS

| DE | 102011088034 A1 | 6/2013 |
| DE | 102013200065 A1 | 7/2014 |
| JP | S6012639 U | 1/1985 |

OTHER PUBLICATIONS

International Search Report for Application No. PCT/US2019/015118 dated Apr. 10, 2019, 4 pages.
(Continued)

*Primary Examiner* — Mark A Laurenzi
*Assistant Examiner* — Mickey H France
(74) *Attorney, Agent, or Firm* — Howard & Howard Attorneys PLLC

(57) ABSTRACT

A two-stage valve assembly for a turbocharger includes a movable primary valve adapted to open and close a valve seat of the turbocharger. The primary valve has at least one opening extending axially therethrough. The two-stage valve assembly also includes a movable secondary valve coupled to the primary valve to open and close the at least one opening of the primary valve. The two-stage valve assembly further includes a spring disposed between the primary valve and the secondary valve to seat the secondary valve against the primary valve. The secondary valve is adapted to be coupled to a valve arm of the turbocharger such that relative small movement of the valve arm causes the secondary valve to move and open the opening to allow some exhaust gas of the turbocharger to escape through the at least one opening without moving the primary valve relative to the valve seat.

17 Claims, 14 Drawing Sheets

(51) Int. Cl.
*F16K 1/52* (2006.01)
*F16K 1/44* (2006.01)

(52) U.S. Cl.
CPC .......... *F16K 1/2014* (2013.01); *F16K 1/2021* (2013.01); *F16K 1/443* (2013.01); *F16K 1/52* (2013.01); *F05B 2220/40* (2013.01)

(58) Field of Classification Search
CPC ....... Y10T 137/88022; Y10T 137/8803; Y10T 13/88038; Y10T 137/86944
USPC ................................................... 60/602, 603
See application file for complete search history.

(56) References Cited

U.S. PATENT DOCUMENTS

| | | | | |
|---|---|---|---|---|
| 2,796,082 A * | 6/1957 | Green | ..................... | F16K 1/221 137/630.15 |
| 2,805,038 A * | 9/1957 | Towler | ................ | F16K 31/3835 251/28 |
| 3,620,195 A * | 11/1971 | Heinz | ..................... | F02B 53/06 123/207 |
| 4,408,581 A * | 10/1983 | Pfalzgraf | ................ | F02D 9/102 123/337 |
| 4,827,884 A * | 5/1989 | Cook | ..................... | F02D 9/102 123/336 |
| 6,234,208 B1 | 5/2001 | Magdelyns et al. | | |
| 7,905,254 B2 * | 3/2011 | Takeda | ..................... | F16K 1/443 137/630 |
| 9,188,088 B2 * | 11/2015 | Eggler | ................. | F16K 31/047 |
| 9,416,724 B2 | 8/2016 | Byrd et al. | | |
| 9,447,697 B2 * | 9/2016 | Markyvech | ........... | F01D 17/105 |
| 2003/0019471 A1 | 1/2003 | Geyer | | |
| 2005/0166979 A1 * | 8/2005 | Berger | ..................... | F16K 1/443 137/630.15 |
| 2007/0204616 A1 | 9/2007 | Martin et al. | | |
| 2009/0205333 A1 * | 8/2009 | Bielass | ................... | F02B 37/16 60/605.1 |
| 2013/0327036 A1 * | 12/2013 | Bogner | ................. | F01D 17/105 60/600 |
| 2014/0041380 A1 | 2/2014 | Byrd et al. | | |
| 2015/0219121 A1 | 8/2015 | King | | |
| 2017/0362996 A1 * | 12/2017 | Ali Khan | ............... | F02B 37/186 |
| 2018/0010696 A1 * | 1/2018 | Wang | ...................... | F16K 1/443 |

OTHER PUBLICATIONS

Machine-assisted English translation for JPS 60-12639 extracted from espacenet.com database on Apr. 25, 2019, 3 pages
English language abstract and machine-assisted English translation for DE 10 2011 088 034 extracted from espacenet.com database on Feb. 1, 2018, 17 pages.
English language abstract and machine-assisted English translation for DE 10 2013 200 065 extracted from espacenet.com database on Feb. 1, 2018, 17 pages.

\* cited by examiner

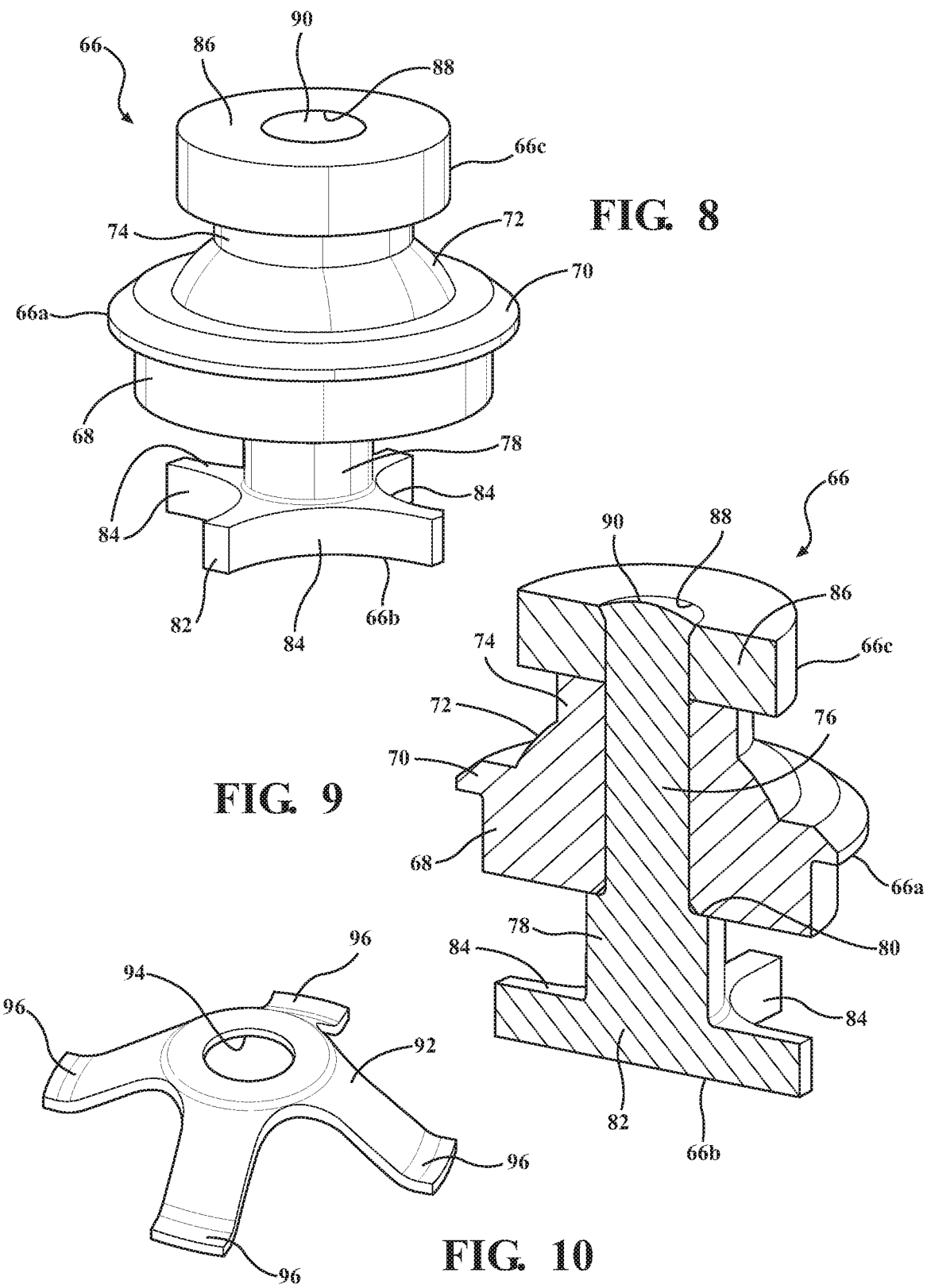

TWO-STAGE VALVE ASSEMBLY FOR TURBOCHARGER

BACKGROUND OF INVENTION

1. Field of the Invention

The present invention relates generally to turbochargers and, more specifically, to a two-stage valve assembly for a turbocharger.

2. Description of the Related Art

It is known to provide a turbocharger for an engine of a vehicle such as an automotive vehicle. An automotive turbocharger typically includes a compressor wheel and a turbine wheel on a common turbocharger shaft supported by bearings in a bearing housing. Alternatively, the compressor wheel and turbine wheel may be mechanically decoupled, wherein the turbine wheel drives an electric generator that, in turn, delivers electrical power to an electric motor that drives the compressor wheel. The turbine wheel of the turbocharger extracts energy from exhaust gas of the engine, and the extracted energy is transferred to the compressor wheel. The compressor wheel increases an intake air density into the engine, which in turn allows for a greater quantity of fuel to be burned for a given air-fuel ratio. As a result, the engine develops more power.

Turbine bypass valves used on current automotive turbocharger applications are typically large in diameter and behave in an on-off/all-or-nothing manner. In addition, there is insufficient control of conventional/large TBV around the open/closed point and no good/smooth transition between the valve open and closed positions.

Therefore, it is desirable to provide a two-stage valve assembly for a turbocharger that allows for good flow control at the valve opening/closing point. It is also desirable to provide a turbocharger with a two-stage valve assembly with high resolution/control of a waste gate or turbine bypass valve at the valve opening/lift point. Thus, there is a need in the art to provide a two-stage valve assembly for a turbocharger that meets at least one of these desires.

SUMMARY OF THE INVENTION

The present invention provides a two-stage valve assembly for a turbocharger including a movable primary valve adapted to open and close a valve seat of the turbocharger. The primary valve has at least one opening extending axially therethrough. The two-stage valve assembly also includes a movable secondary valve coupled to the primary valve to open and close the at least one opening of the primary valve. The two-stage valve assembly also includes a spring disposed between the primary valve and the secondary valve to seat the secondary valve against the primary valve. The secondary valve is adapted to be coupled to a valve arm of the turbocharger such that relative small movement of the valve arm causes the secondary valve to move and open the opening to allow some exhaust gas of the turbocharger to escape through the at least one opening without moving the primary valve relative to the valve seat.

The present invention also provides a turbocharger for receiving exhaust gas from an internal combustion engine including a turbine housing having a valve seat and defining a turbine housing interior, a rotatable turbine wheel disposed within the turbine housing interior for receiving the exhaust gas, and a two-stage valve assembly coupled to the valve seat and adapted to divert a portion of the exhaust gas away from the turbine wheel. The two-stage valve assembly includes a movable primary valve to open and close the valve seat. The primary valve has at least one opening extending axially therethrough. The two-stage valve assembly also includes a movable secondary valve coupled to the primary valve to open and close the at least one opening of the primary valve. The two-stage valve assembly further includes a spring disposed between the primary valve and the secondary valve to seat the secondary valve against the primary valve. The secondary valve is coupled to a valve arm of the turbocharger such that relative small movement of the valve arm causes the secondary valve to move and open the at least one opening to allow some of the exhaust gas of the turbocharger to escape through the at least one opening without moving the primary valve relative to the valve seat.

One advantage of the present invention is that a two-stage valve assembly is provided for a turbocharger having a movable primary valve with at least one opening extending axially therethrough to open and close a valve seat of the turbocharger and a movable secondary valve coupled to the primary valve to open and close the at least one opening of the primary valve. Another advantage of the present invention is that the two-stage valve assembly allows relative small movement of a valve arm to cause the secondary valve to move and open the at least one opening to allow some exhaust gas of the turbocharger to escape through the at least one opening without moving the primary valve relative to the valve seat. Yet another advantage of the present invention is that the two-stage valve assembly allows for good flow control at the valve opening/closing point. Still another advantage of the present invention is that the two-stage valve assembly provides high resolution/control of a waste gate or turbine bypass valve at the valve first opening/lift point.

BRIEF DESCRIPTION OF THE DRAWINGS

Other objects, features, and advantages of the present invention will be readily appreciated as the same becomes better understood after reading the subsequent description taken in connection with the accompanying drawings.

FIG. 8 is a perspective view of a secondary valve of the two-stage valve assembly of FIGS. 2-7.

FIG. 9 is a sectional view of the secondary valve of FIG. 8.

FIG. 10 is a perspective view of an alternative spring of the two-stage valve assembly of FIGS. 2-7.

DETAILED DESCRIPTION OF THE INVENTION

Figure 1:
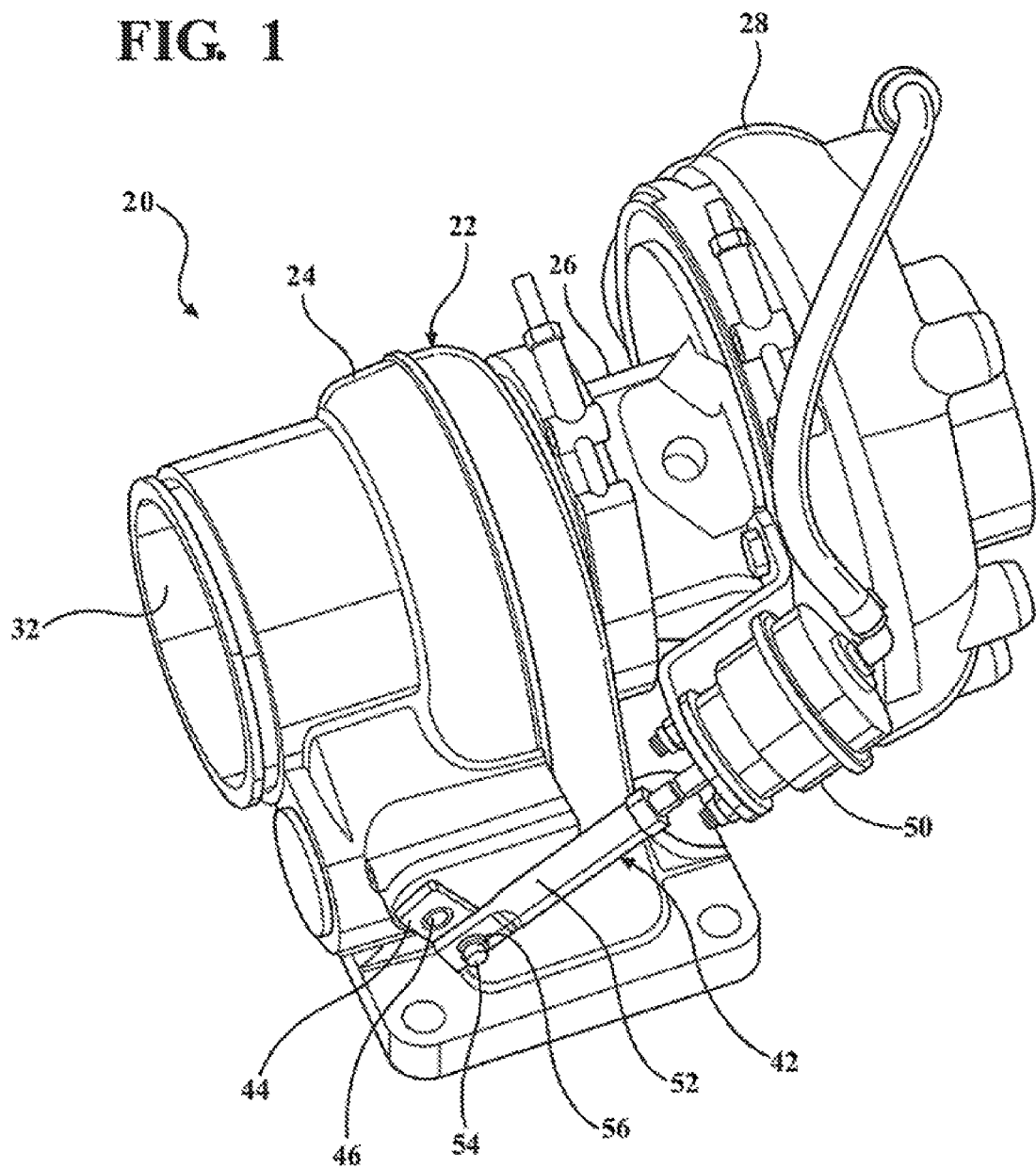
FIG. 1 is a perspective view of a turbocharger, according to one embodiment of the present invention.
Figure 1A:
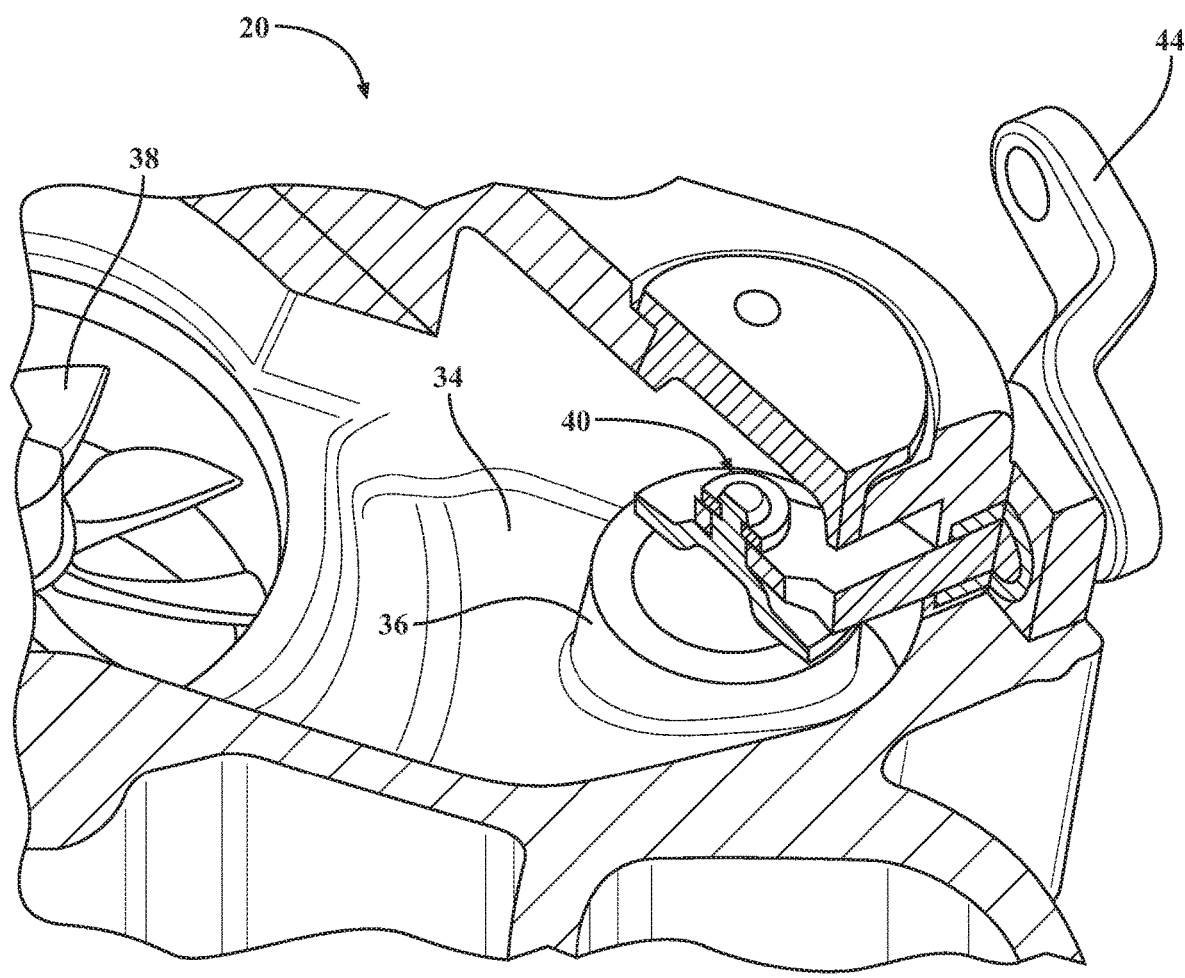
FIG. 1A is a perspective fragmentary view of a portion of the turbocharger of FIG. 1.
Figure 2:
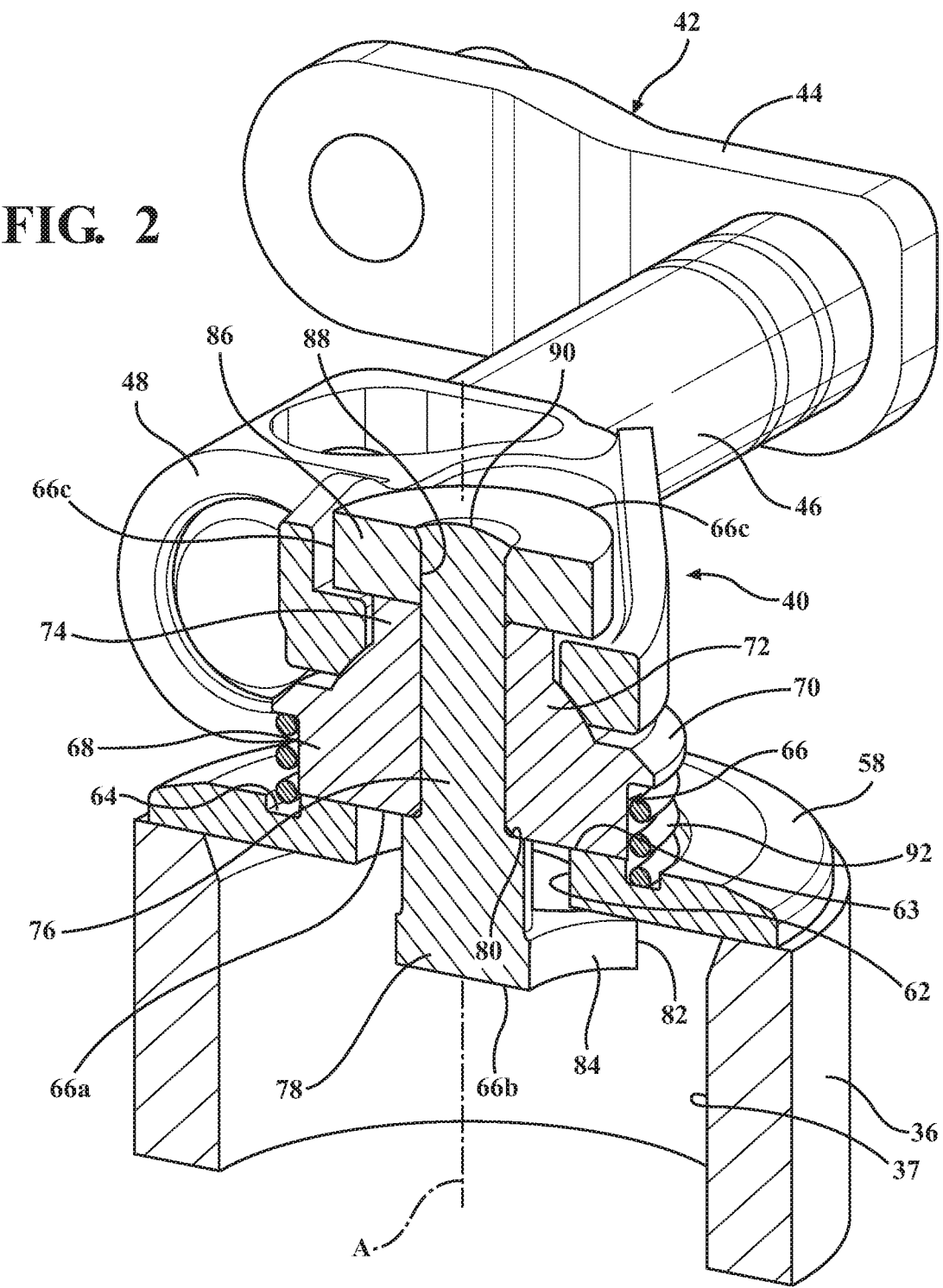
FIG. 2 is a perspective fragmentary view of one embodiment of a two-stage valve assembly, according to the present invention, for the turbocharger of FIG. 1.
Figure 3:
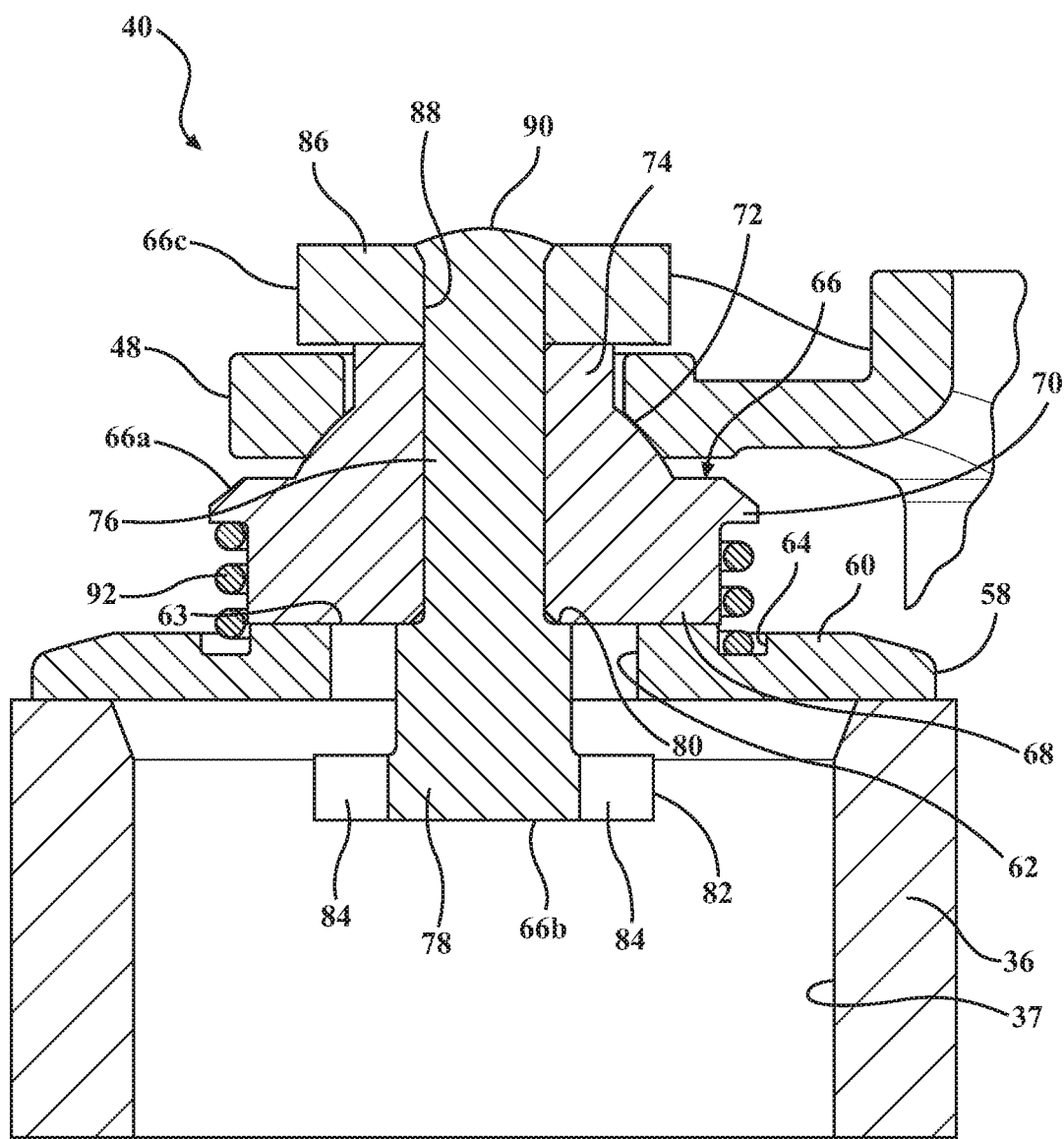
FIG. 3 is a sectional view of the two-stage valve assembly, according to the present invention, for the turbocharger of FIG. 1.

Referring now to the figures, where like numerals are used to designate like structure unless otherwise indicated, a turbocharger 20, according to one embodiment of the present invention, is shown in FIG. 1. As illustrated in FIG. 1, the turbocharger 20 includes a housing, generally indicated at 22, having a turbine housing 24, a bearing housing 26, and a compressor housing 28. The turbine housing 24 has a turbine exhaust gas inlet (not shown) to receive exhaust gas from an internal combustion engine (not shown) and a turbine exhaust gas outlet 32. As illustrated in FIG. 2, the turbine housing 24 includes a turbine housing interior 34 and a valve seat 36 disposed in the turbine housing interior 34. The turbocharger 20 also includes a rotatable turbine wheel, generally indicated at 38, disposed in the turbine housing interior 34 of the turbine housing 24. The turbocharger 20 further includes a rotatable turbocharger shaft (not shown) coupled to the turbine wheel 38 and rotationally supported by bearings in the bearing housing 26. The turbine wheel 38 is solidly affixed to one end of the turbocharger shaft, becoming a shaft and wheel assembly. An exemplary turbocharger is disclosed in U.S. Patent Application Publication No. 2015/0219121 to King, the entire disclosure of which is hereby expressly incorporated by reference.

Referring to FIGS. 1 and 2, the turbocharger 20 further includes a two-stage valve assembly, according to the present invention and generally indicated at 40, coupled to the valve seat 36 and adapted to divert a portion of the exhaust gas away from the turbine wheel 38. The turbocharger 20 also includes an actuating assembly, generally indicated at 42, for actuating the two-stage valve assembly 40. The actuating assembly 42 includes a lever arm 44 and a pin 46 pivotally connecting the lever arm 44 to the turbine housing 26. The actuating assembly 42 also includes a valve arm 48 coupled to the pin 46 and the two-stage valve assembly 40.

The actuating assembly 42 further includes a pneumatic actuator 50 having an end link 52 coupled to a post 54 of the lever arm 44 by a suitable mechanism such as a clip 56. It should be appreciated that the actuator assembly 42 is known in the art and connected to a source of pneumatic air such as from the compressor housing 28. It should also be appreciated that the actuator assembly 42 actuates the two-stage valve assembly 40. It should further be appreciated that the actuator assembly 42 may be of a type other than pneumatic such as electric.

Referring to FIGS. 2-10, in one embodiment, the two-stage valve assembly 40 includes a movable primary valve 58 adapted to open and close the valve seat 36 of the turbocharger 20. In one embodiment, the primary valve 58 has a generally circular cross-sectional shape. The primary valve 58 includes a base portion 60 extending radially outwardly and circumferentially. The base portion 60 has a diameter greater than a diameter of the valve seat 36. The primary valve 58 has at least one opening 62 extending axially through the base portion 60. In one embodiment, there is single opening 62 that is generally circular in shape. The primary valve 58 has a groove 64 extending circumferentially and axially therein to seat one end of a spring 92 to be described in the primary valve 58. In one embodiment, the groove 64 is spaced radially from the opening 62 and has a generally circular shape. The primary valve 58 is made of metal material and is integral, unitary, and one-piece.

The two-stage valve assembly 40 also includes a movable secondary valve, generally indicated at 66, coupled to the primary valve 58 to open and close the at least one opening 62 of the primary valve 58. In one embodiment, the secondary valve 66 includes a first or seat member 66a, a second or actuating member 66b, and a connecting member 66c. In one embodiment, the seat member 66a has a seat portion 68 extending radially outwardly and circumferentially and movable relative to the primary valve 58 to open and close the at least one opening 62 in the primary valve 68. In one embodiment, the seat portion 68 is generally circular in cross-sectional shape and has a diameter greater than a diameter of the opening 62. The seat member 66a also has a flange portion 70 extending radially outwardly from the seat portion 68 to seat one end of a spring 92 to be described in the secondary valve 66. The flange portion 70 has a diameter greater than the seat portion 68. The seat member 66a has an arm portion 72 extending axially and circumferentially. In one embodiment, the arm portion 72 has an arcuate or spherical profile to ensure correct seating of a corresponding mating portion of the valve arm 48. The arm portion 72 has a diameter less than a diameter of the seat portion 68. The seat member 66a further has a connection portion 74 extending circumferentially and axially from the arm portion 72. In one embodiment, the connection portion 74 has a generally circular cross-section and a diameter less than the arm portion 72. The seat member 66a is made of a metal material and is integral, unitary, and one-piece.

The actuating member 66b has a shaft portion 76 extending along an axial axis A. In one embodiment, the shaft portion 76 is generally cylindrical in shape with a generally circular cross-sectional shape. The actuating member 66b has a base portion 78 extending radially outwardly from the shaft portion 76. In one embodiment, the base portion 78 has a diameter greater than a diameter of the shaft portion 76 to form a shoulder 80 to engage the seat portion 68 of the seat member 66a. The actuating member 66b has a flange portion 82 extending radially outwardly from the base portion 78. The flange portion 82 has a diameter greater than the base portion 78. In one embodiment, the flange portion 82 has at least one or a plurality of recess 84 extending radially therein to allow the exhaust gas to pass through the flange portion 82 and the at least one opening 62 in the primary valve 58. In one embodiment, the recesses 84 are generally arcuate in shape. The actuating member 66b is made of a metal material and is integral, unitary, and one-piece.

The connecting member 66c may be a retaining washer and is adapted to couple the actuating member 66b to the valve arm 48. In one embodiment, the connecting member 66c includes a top portion 86 having an opening 88 extending axially therethrough. In one embodiment, the top portion 86 and opening 88 are generally circular in cross-sectional shape. The opening 88 is disposed about the shaft portion 76 of the actuating member 66b. The top portion 86 extends radially outwardly relative to the axis A and is disposed adjacent the connection portion 74 of the seat member 66a. The end 90 of the shaft portion 76 of the actuating member 66b is expanded or peened over to have a diameter greater than the opening 88 or welded to secure the connecting member 66c to the actuating member 66b. The connecting member 66c is made of a metal material and is integral, unitary, and one-piece.

The two-stage valve assembly 40 further includes a spring 92 disposed between the primary valve 58 and the secondary valve 66 to seat the secondary valve 66 against the primary valve 58. In one embodiment illustrated in FIGS. 2-7, the spring 92 is a coil spring. The spring 92 extends axially and has one end disposed in the groove 64 of the primary valve 58 and has another end disposed adjacent the flange portion 70 of the seat member 66a of the primary valve 58. In another embodiment illustrate in FIG. 10, the spring 92 is a leaf spring. In this embodiment, the spring 92 has an opening 94 and a plurality of legs 96 extending radially outwardly and axially and spaced circumferentially. The spring 92 may be used in different sizes and spring rates. The spring 92 is made of a metal material and is integral, unitary, and one-piece.

Figure 4:
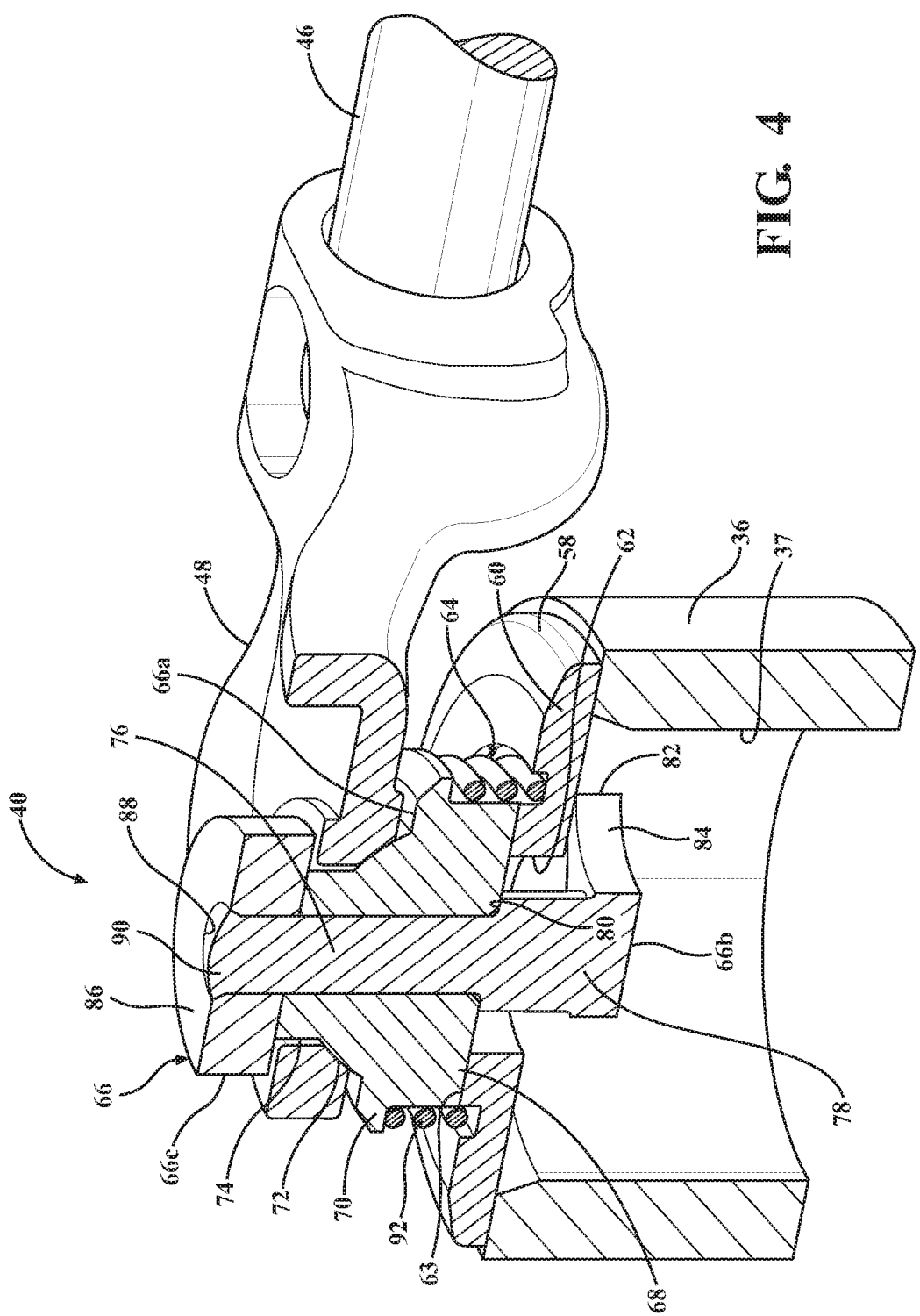
FIG. 4 is a perspective fragmentary view of the two-stage valve assembly, according to the present invention, for the turbocharger of FIG. 1 illustrated in a first operational position.
Figure 5:
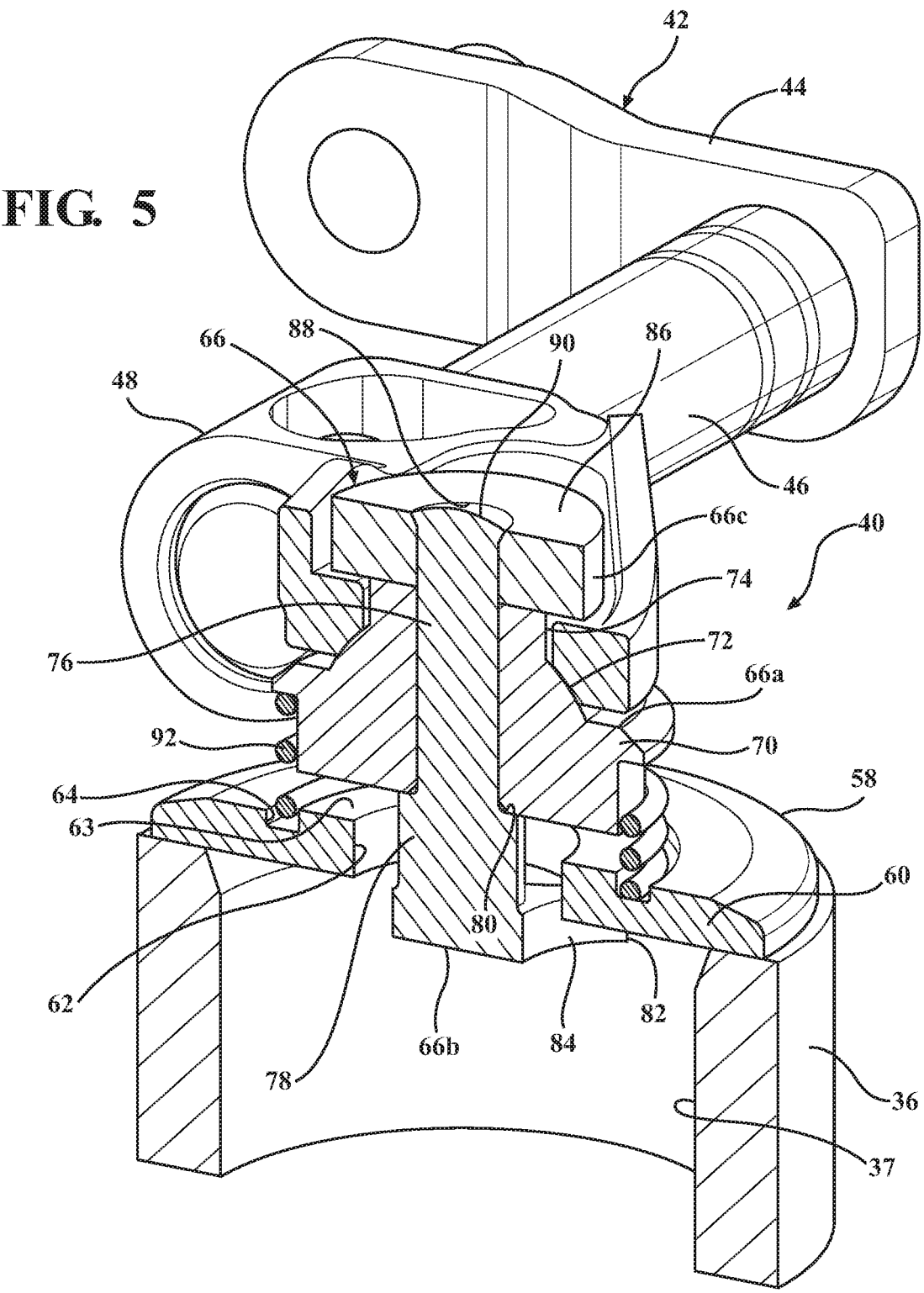
FIG. 5 is a perspective fragmentary view of the two-stage valve assembly, according to the present invention, for the turbocharger of FIG. 1 illustrated in a second operational position.
Figure 6:
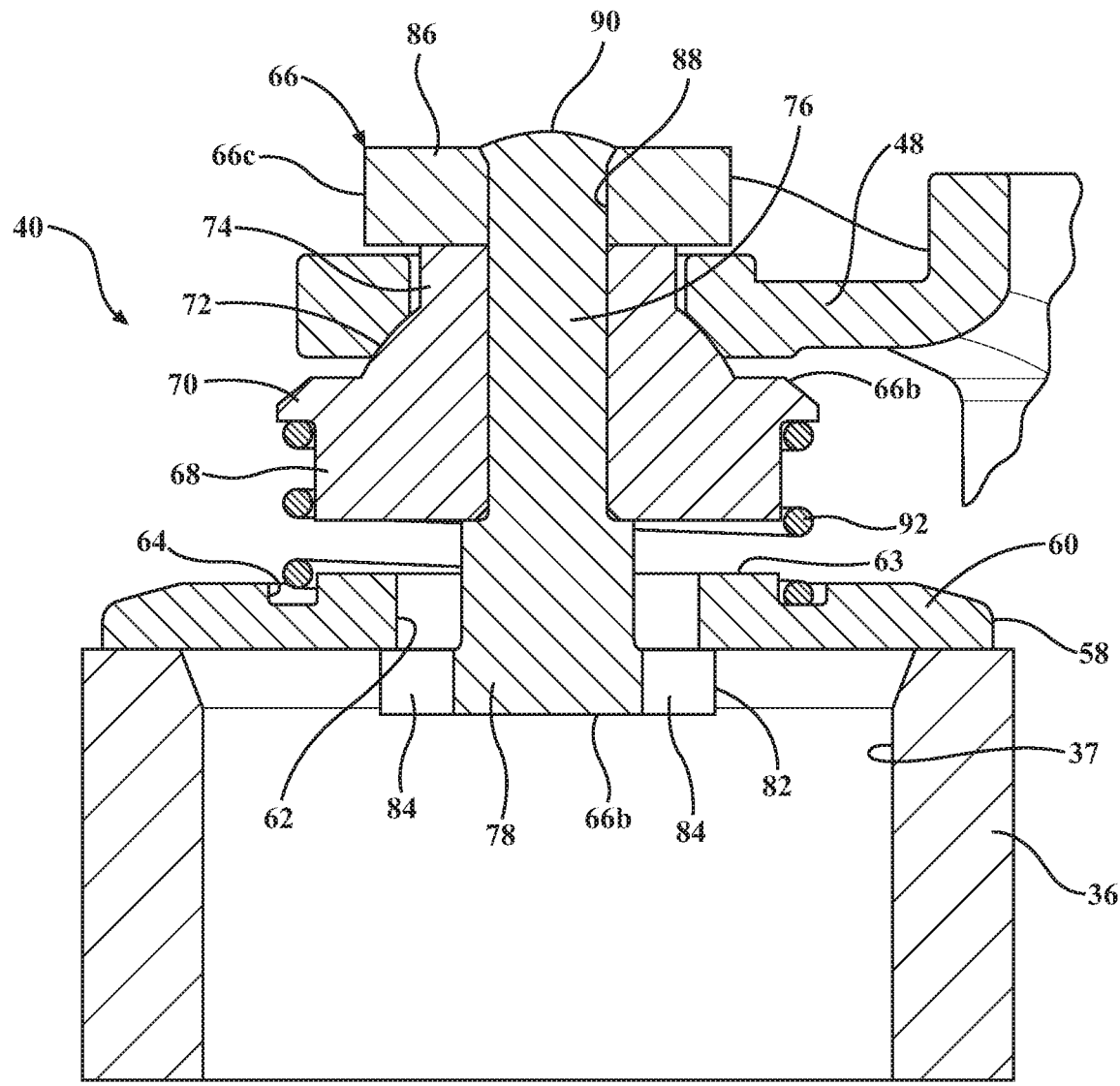
FIG. 6 is a sectional view of the two-stage valve assembly, according to the present invention, for the turbocharger of FIG. 1 illustrated in the second operational position.
Figure 7:
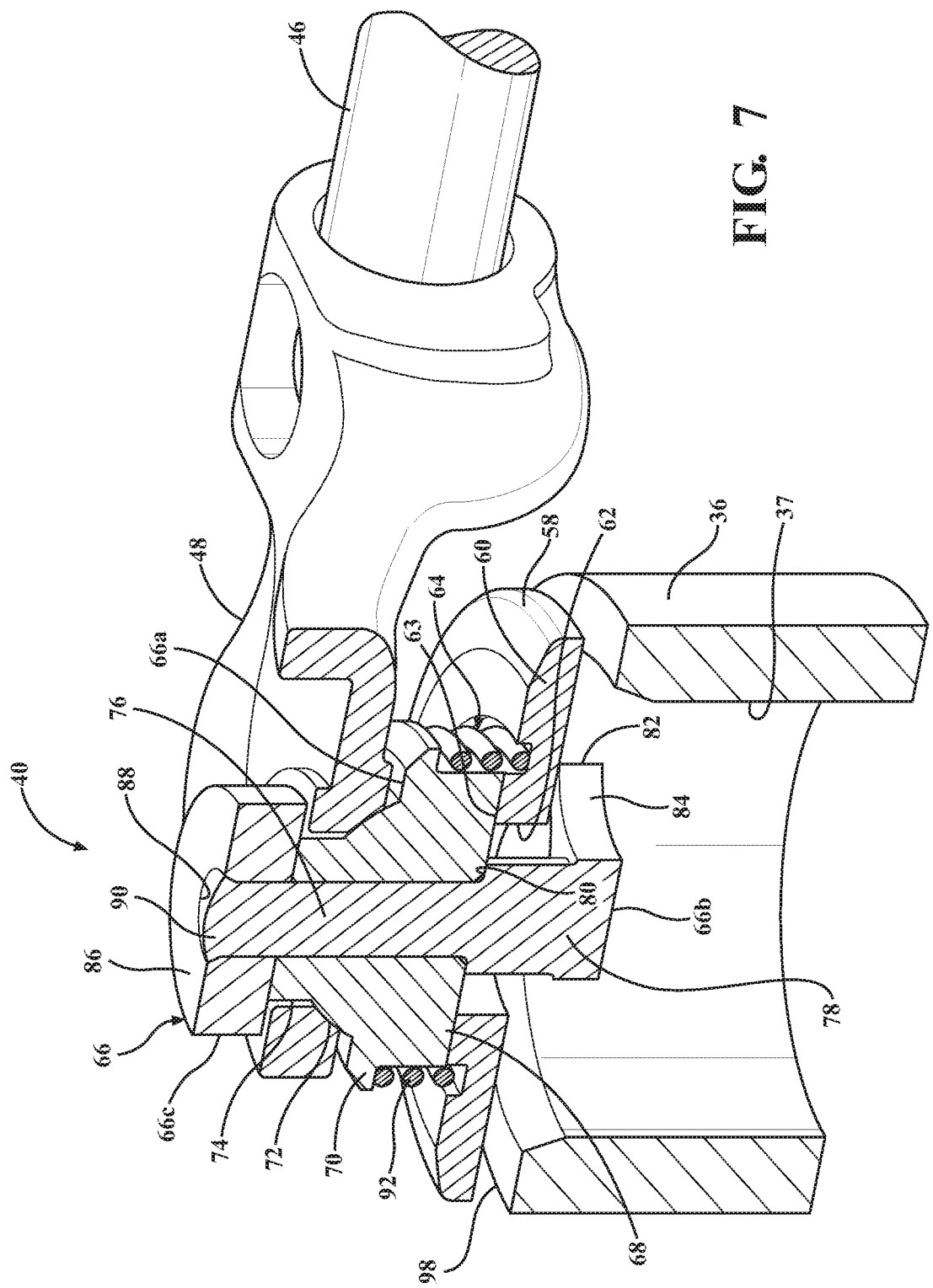
FIG. 7 is a perspective fragmentary view of the two-stage valve assembly, according to the present invention, for the turbocharger of FIG. 1 illustrated in a third operational position.

In operation, the primary valve 58 is seated on the valve seat 36 and the seat member 66a of the secondary valve 66 is seated on the primary valve 58 and the connecting member 66c is coupled to the valve arm 48 of the turbocharger 20 as illustrated in FIG. 4. In a first stage of operation, relative small movement of the valve arm 48 causes the secondary valve 66 to move and open the at least one opening 62 in the primary valve 58 to allow some exhaust gas of the turbocharger 20 to escape through the at least one opening 62 without moving the primary valve 58 relative to the valve seat 36 as illustrated in FIGS. 5 and 6. In one embodiment, the relative small movement of the valve arm 48 is typically from zero (0) millimeters to approximately ten (10) millimeters. In another embodiment, the relative small movement of the valve arm 48 is typically from zero (0) millimeters to approximately three (3) millimeters. As illustrated, the valve arm 48 moves the connecting member 66c and actuating member 66b, in turn, moving the seat member 66a upwardly and away from the primary valve 58 to an open position. In the open position, exhaust gas moves through the recesses 84 and the at least one opening 62 and between the seat member 66a and the primary valve 58. As more load is applied to the valve arm 48, the spring 92 is overcome and the at least one opening 62 is closed, thereby unsealing the valve seat 36 and fully opening the primary valve 58 to allow exhaust gas to escape from the valve seat 36 as illustrated in FIG. 7. When the valve arm 48 is moved toward the valve seat 36, the two-stage valve assembly 40 closes in a closed position and blocks all gas flow as illustrated in FIG. 4. It should be appreciated that when the primary valve 58 is seated and the secondary valve 66 is open, gas is allowed to flow through the at least one opening 62, thereby affording fine flow control/adjustment.

Referring to FIGS. 11-14, another embodiment, according to the present invention, of the two-stage valve assembly 40 is shown. Like parts of FIGS. 2-10 have like reference numerals. In this embodiment, the primary valve 58 includes a plurality of openings 62 extending axially through the base portion 60. In one embodiment, the openings 62 are generally circular in shape. The primary valve 58 includes a shaft portion 63 extending along the axial axis A from the base portion 60. In one embodiment, the shaft portion 63 is generally cylindrical in shape with a generally circular cross-sectional shape. The openings 62 are spaced radially from the shaft portion 63. The shaft portion 63 has a reduced diameter portion 65 at the end to allow the connecting member 66c to be disposed about the portion 65. The end of the reduced diameter portion 65 of the primary valve 58 is expanded or peened over to have a diameter greater than the opening 88 of the connecting member 66c or welded to secure the connecting member 66c to the actuating member 66b. The primary valve 58 is made of a metal material and is integral, unitary, and one-piece.

In this embodiment, the seat member 66a has a seat portion 68 extending radially outwardly and circumferentially and movable relative to the primary valve 58 to open and close the openings 62 in the primary valve 68. In one embodiment, the seat portion 68 is generally circular in cross-sectional shape and has a diameter greater than a diameter of the circumference of the openings 62. The seat member 66a has a cavity portion 71 extending axially therein from the seat portion 68 to house the spring 92 in the secondary valve 66. The cavity portion 71 has shoulder 73 to seat one end of the spring 92 and the other end of the spring 92 seats against a shoulder 75 of the primary valve 58. The seat member 66a has an arm portion 72 extending axially and circumferentially. In one embodiment, the arm portion 72 has an arcuate or spherical profile to ensure correct seating with the corresponding mating portion of the valve arm 48. The arm portion 72 has a diameter less than a diameter of the seat portion 68. The seat member 66a is made of a metal material and is integral, unitary, and one-piece. It should be appreciated that, in this embodiment of the two-stage valve assembly 40, the spring 92 is shielded from high temperature bypass gas flow.

Figure 11:
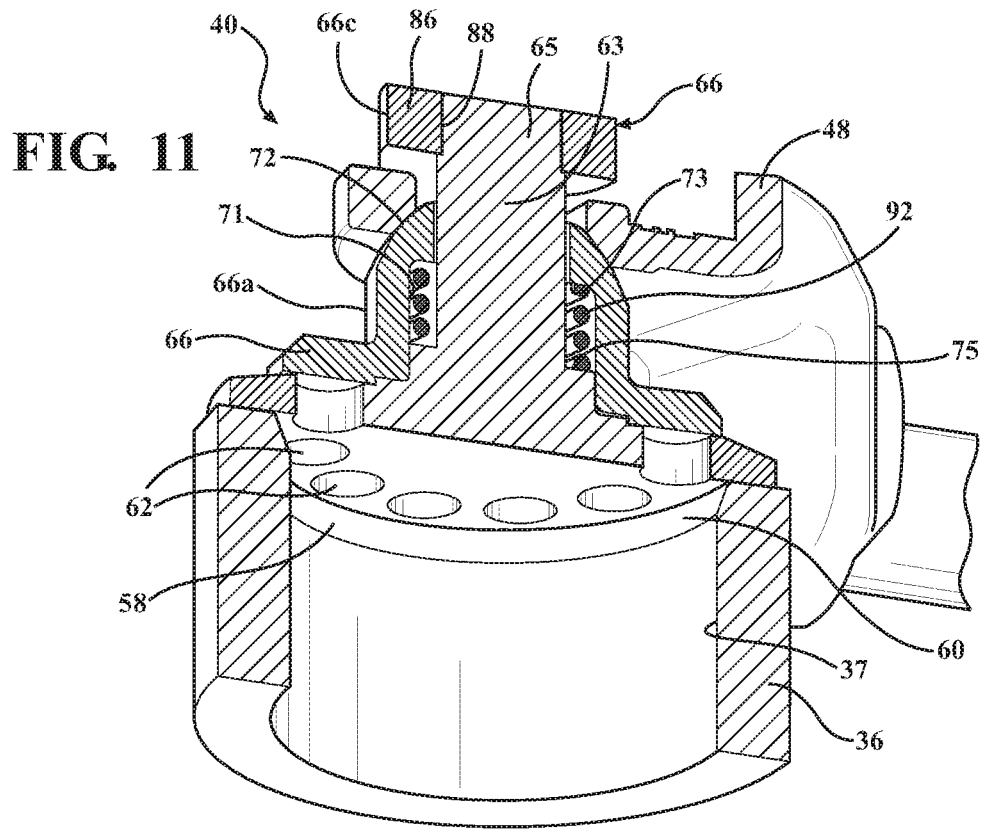
FIG. 11 is a perspective fragmentary view of another embodiment, according to the present invention, of a two-stage valve assembly for the turbocharger of FIG. 1.
Figure 12:
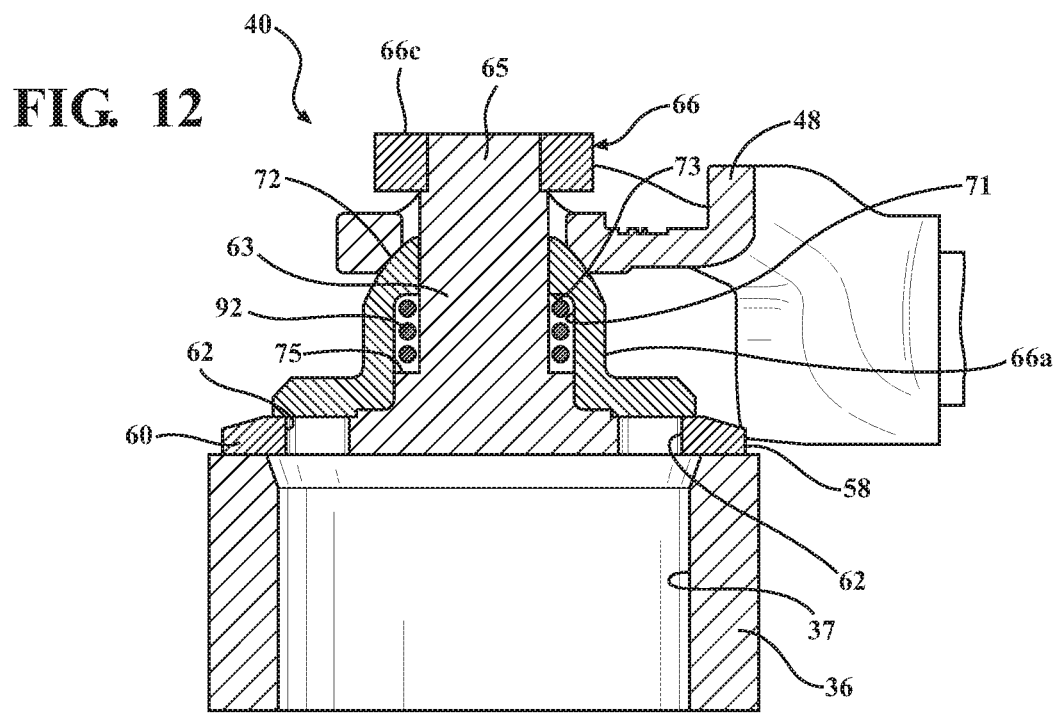
FIG. 12 is a sectional view of the two-stage valve assembly, according to the present invention, of FIG. 11.
Figure 13:
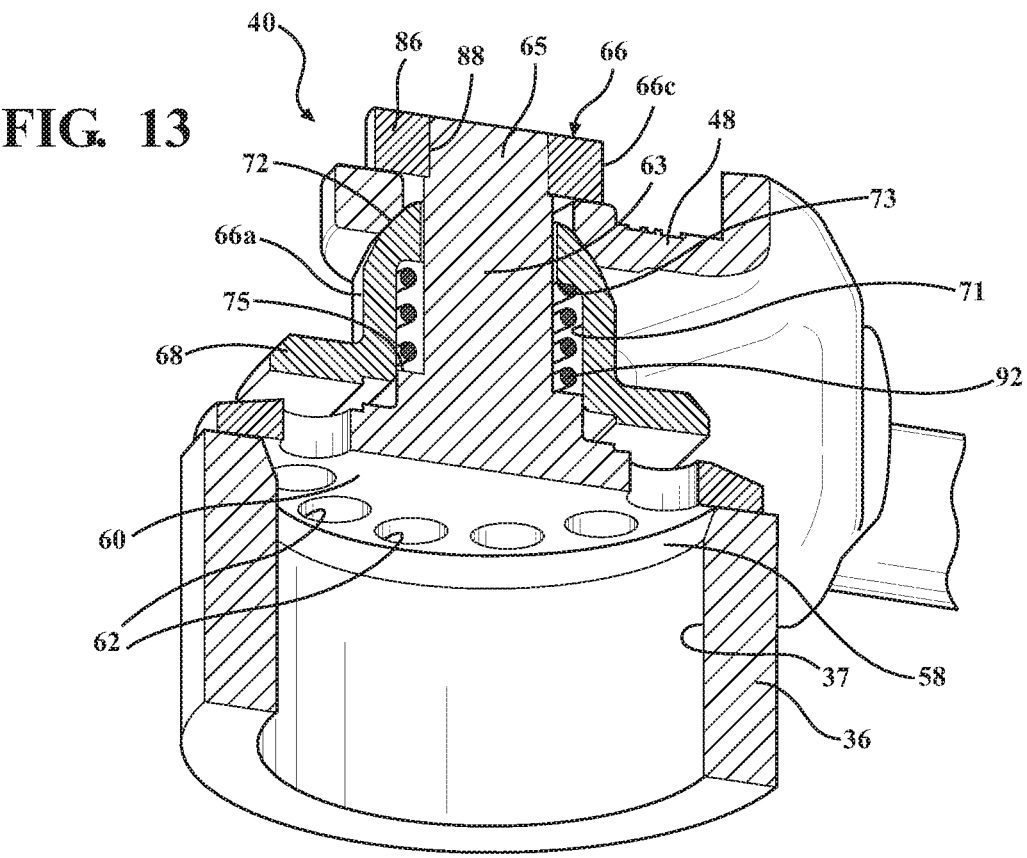
FIG. 13 is a perspective fragmentary view of the two-stage valve assembly, according to the present invention, of FIG. 11 illustrated in a first operational position.
Figure 14:
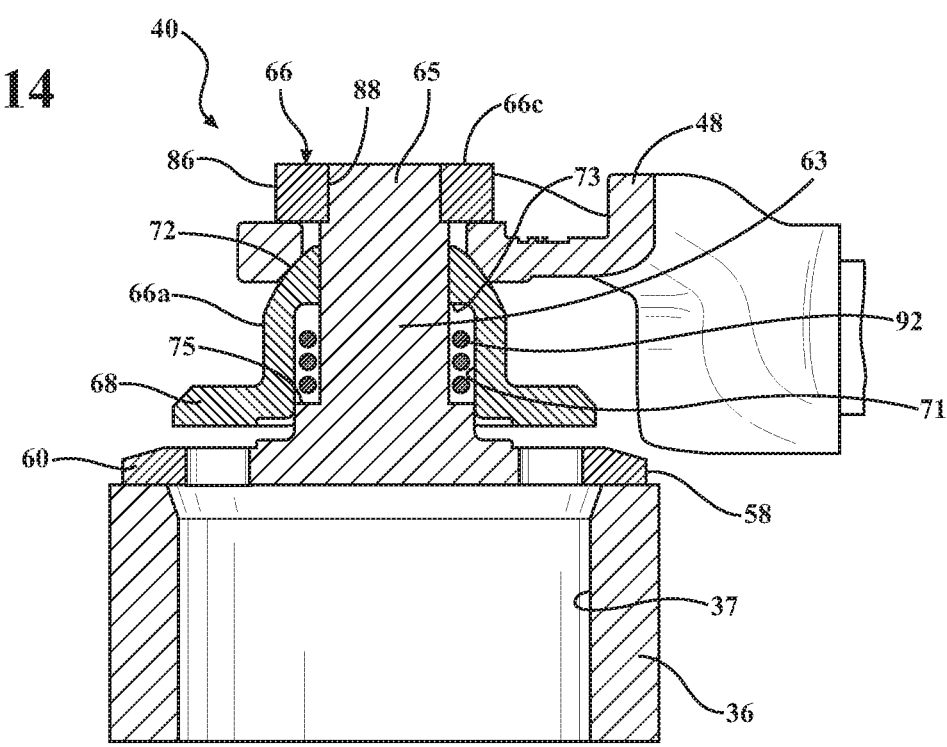
FIG. 14 is a perspective fragmentary view of the two-stage valve assembly, according to the present invention, of FIG. 11 illustrated in a second operational position.

In operation, the primary valve 58 is seated on the valve seat 36 and the seat member 66a of the secondary valve 66 is seated on the primary valve 58 and the connecting member 66c is coupled to the valve arm 48 of the turbocharger 20 as illustrated in FIGS. 11 and 12. In a first stage of operation, relative small movement of the valve arm 48 allows the secondary valve 66 to move and open the openings 62 in the primary valve 58 to allow some exhaust gas of the turbocharger 20 to escape through the openings 62 without moving the primary valve 58 relative to the valve seat 36 as illustrated in FIGS. 13 and 14. In one embodiment, the relative small movement of the valve arm 48 is typically from zero (0) millimeters to approximately ten (10) millimeters. In another embodiment, the relative small movement of the valve arm 48 is typically from zero (0) millimeters to approximately three (3) millimeters. As illustrated, the valve arm 48 moves upwardly and the spring 92 moves the seat member 66a upwardly and away from the primary valve 58 to an open position. In the open position, exhaust gas moves through the openings 62 and between the seat member 66a and the primary valve 58. As more load is applied to the valve arm 48, the valve arm 48 moves the connecting member 66c of the secondary valve 66 upward, thereby unsealing the valve seat 36 and fully opening the primary valve 58 to allow exhaust gas to escape from the valve seat 36. It should be appreciated that when the primary valve 58 is seated and the secondary valve 66 is open, gas is allowed to flow through the openings 62, thereby affording fine flow control/adjustment.

Figure 15:
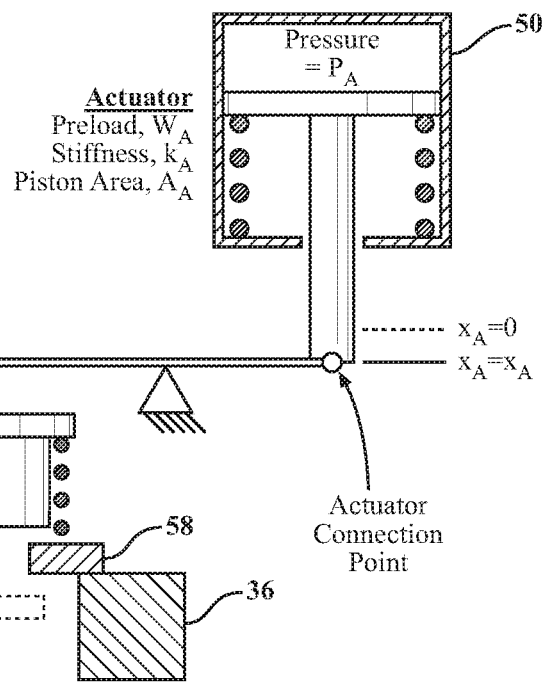
FIG. 15 is a schematic view of the turbocharger of FIG. 1.
Figure 16:
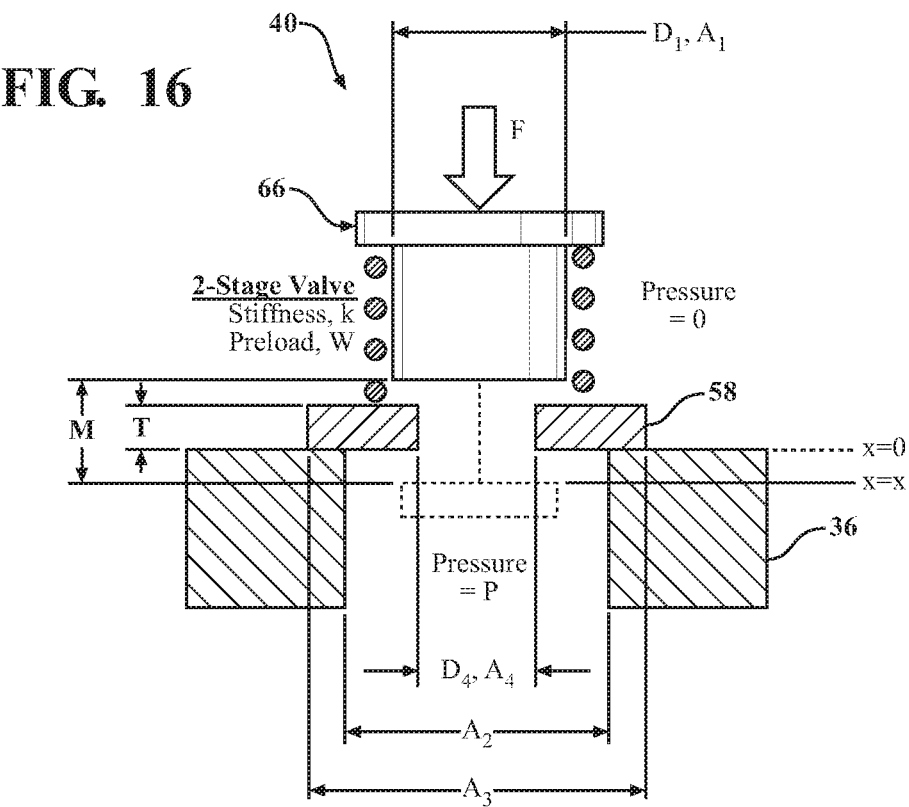
FIG. 16 is a schematic view of the two-stage valve assembly of FIG. 15.

Referring to FIGS. 15-18, calculations for the function of the two-stage valve assembly 40 is shown. FIG. 15 illustrates the actuator 50 and two-stage valve assembly 40 with preload $W_A$, stiffness $k_A$, and piston area $A_A$ for pressure $P_A$ in the actuator 50 in which an actuator connection point is defined as $X_A=0$ and $X_A=X_A$. FIG. 16 illustrates the two-stage valve assembly 40 with a force F, stiffness k, pre-load W, pressure P, and Diameter $D_1$, $D_4$, Area $A_1$, $A_2$, $A_3$, and $A_4$, and distances T and M. The governing formulas are as follows:

For $0<x<M-t$ $$F=W+kx+PA_1$$

exit area=$3.142*D_1*(M-T-x)$

At primary valve 58 lift point: x=0

$$F=PA_2$$

For primary valve 58 lifted: x<0

$$F=PA_3$$

At the actuator 50 connection: $x_A>0$ $$PA=(W_A+xk_A-F)/A_A$$

Figure 17:
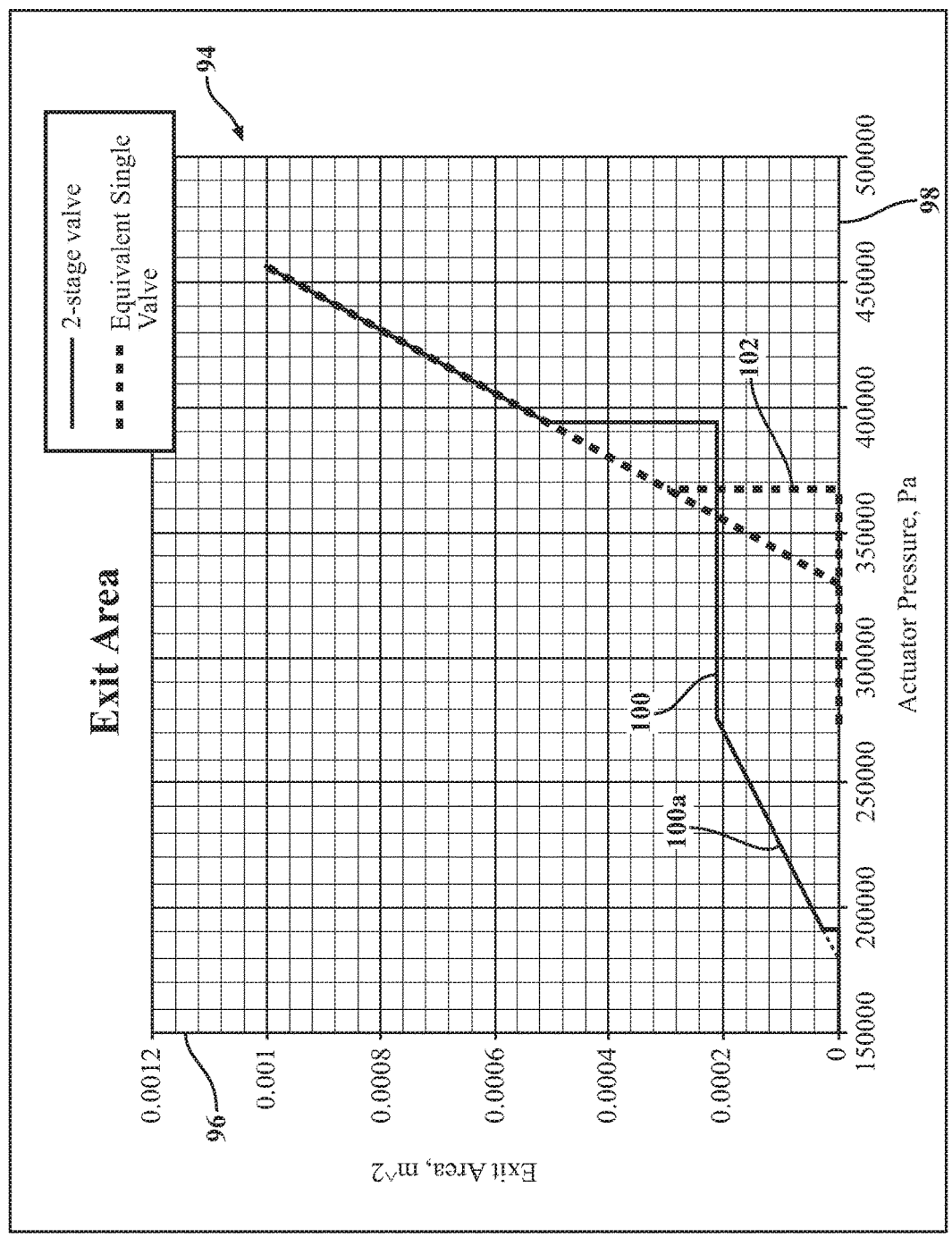
FIG. 17 is a graph of exit area for the two-stage valve assembly of FIG. 15 and an equivalent single valve.
Figure 18:
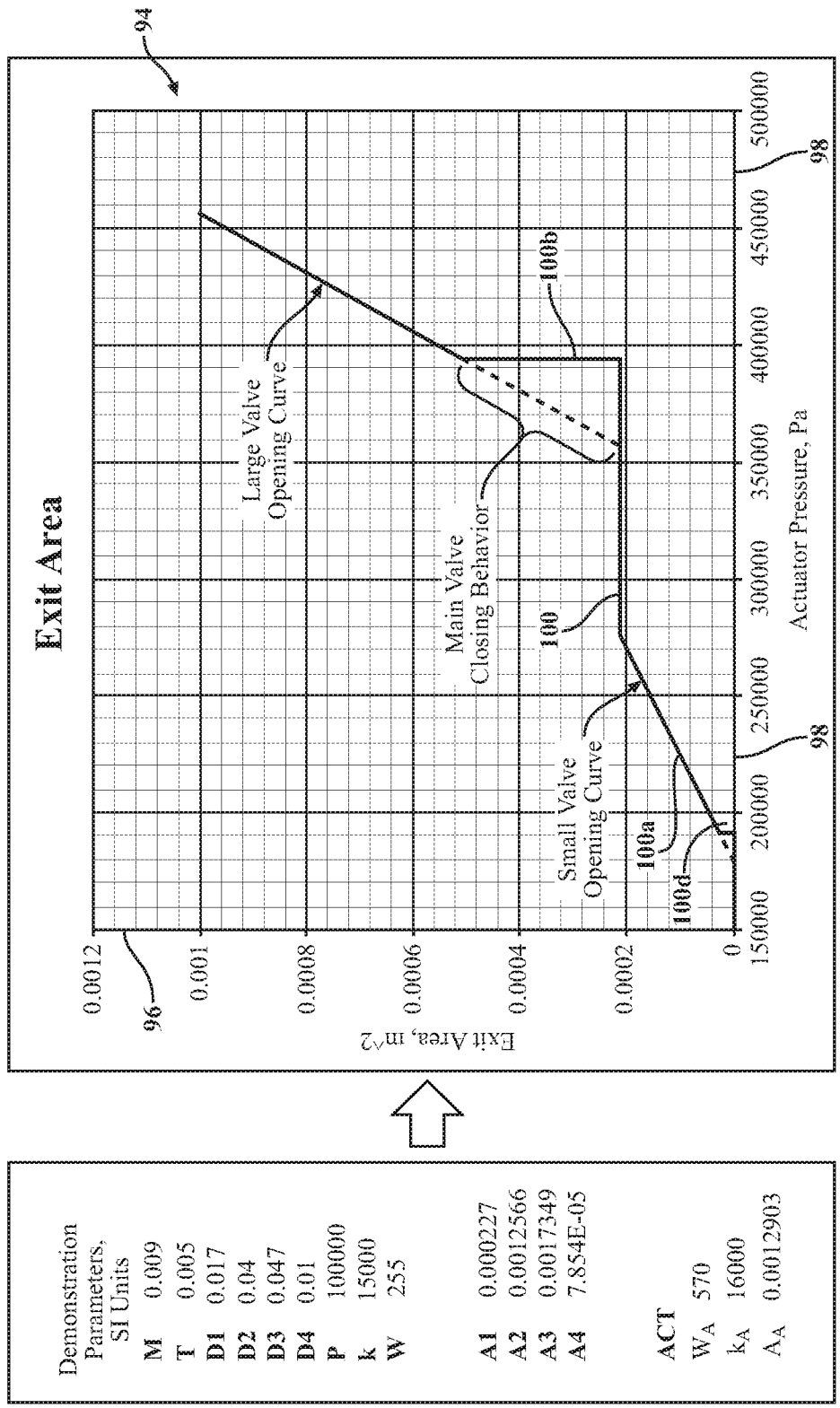
FIG. 18 is a graph of exit area for the two-stage valve assembly of FIG. 15.

As illustrated in FIGS. 17 and 18, a graph 94 of exit area versus actuator pressure is shown for the two-stage valve assembly 40 and an equivalent single valve (not shown). In the graph 94, exit area (m2) of the at least one opening 62 is on a vertical axis 96 and actuator pressure (Pa) of the actuator 50 is on a horizontal axis 98 and a plot 100 of the two-stage valve assembly 40 and a plot 102 of the equivalent singe valve is shown. As illustrated in FIG. 17, a portion 100a of the plot 100 is the fine flow control characteristic gained with the two-stage valve assembly 40 of the present invention. As illustrated in FIG. 18, when the primary valve 58 first lifts, the area acted upon by the exhaust pressure, P, jumps from A2 to A3, causing a jump in position shown by portion 100b of the plot 100. Portion 100c of the plot 100 shows a large valve opening curve of the primary valve 58. Portion 100d of the plot 100 shows a similar behavior occurring for the secondary valve 66, but the change in position is less sensitive to pressure and the areas involved are much smaller. It should be appreciated that the plot 100 is based on demonstration parameters shown next to the graph 94.

Accordingly, the turbocharger 20 of the present invention provides a two-stage valve assembly 40 having the secondary valve 66 that seats against the primary valve 58 to seal the valve seat 36. In the turbocharger 20, relatively small movement of the valve arm 48 causes the secondary valve 66 to lift and some gas can escape, but the spring 92 forces the two valves 58, 66 apart, maintaining the seal with the valve seat 36. The two-stage valve assembly 40 of the turbocharger 20 of the present invention provides very fine control over turbine bypass or waste gage flow around the valve closed position.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed as new and desired to be protected by Letters Patent of the United States is:

1. A two-stage valve assembly for a turbocharger, said two-stage valve assembly comprising:
   a movable primary valve adapted to open and close a valve seat of the turbocharger, said primary valve having at least one opening extending axially therethrough;
   a movable secondary valve coupled to said primary valve to open and close said at least one opening of said primary valve; and
   a spring disposed between said primary valve and said secondary valve to seat said secondary valve against said primary valve, wherein said secondary valve is adapted to be coupled to a valve arm of the turbocharger such that relative small movement of the valve arm causes said secondary valve to move and open said opening to allow some exhaust gas of the turbocharger to escape through said at least one opening without moving said primary valve relative to the valve seat.

2. A two-stage valve assembly as set forth in claim 1 wherein one of said primary valve and said secondary valve includes a shaft portion extending along an axial axis.

3. A two-stage valve assembly as set forth in claim 2 wherein the one of said primary valve and said secondary valve includes a base portion extending radially outwardly from said shaft portion.

4. A two-stage valve assembly as set forth in claim 3 wherein said base portion includes a plurality of recesses extending radially therein to allow the exhaust gas to pass through said base portion and said at least one opening.

5. A two-stage valve assembly as set forth in claim 3 wherein said base portion includes a plurality of openings extending axially therethrough to allow the exhaust gas to pass through said base portion.

6. A two-stage valve assembly as set forth in claim 3 wherein said secondary valve includes a seat portion coupled to and extending radially outwardly relative to said shaft portion and movable relative to said shaft portion to open and close said at least one opening.

7. A two-stage valve assembly as set forth in claim 6 wherein said secondary valve includes a flange portion extending radially outwardly from said seat portion to seat one end of said spring in said secondary valve.

8. A two-stage valve assembly as set forth in claim 6 wherein said secondary valve includes a cavity extending axially into said seat portion to seat one end of said spring in said secondary valve.

9. A two-stage valve assembly as set forth in claim 6 wherein said secondary valve includes a top portion coupled to said seat portion and extending radially outwardly relative to the axis and adapted to couple the valve arm between said seat portion and said top portion.

10. A two-stage valve assembly as set forth in claim 1 wherein said spring is a coil spring.

11. A two-stage valve assembly as set forth in claim 1 wherein said spring is a leaf spring.

12. A two-stage valve assembly as set forth in claim 1 wherein said relative small movement of the valve arm is between zero (0) millimeters and approximately ten (10) millimeters.

13. A two-stage valve assembly as set forth in claim 1 wherein said relative small movement of the valve arm is between zero (0) millimeters and approximately three (3) millimeters.

14. A two-stage valve assembly for a turbocharger, said two-stage valve assembly comprising:
a movable primary valve adapted to open and close a valve seat of the turbocharger, said primary valve having an opening extending therethrough;
a movable secondary valve coupled to said primary valve to open and close said opening of said primary valve, wherein said secondary valve has a shaft portion extending axially along an axis and through said opening of said primary valve, a base portion extending radially outwardly from said shaft portion on a first side of said primary valve, said base portion having a plurality of recess extending radially therein to allow exhaust gas to pass through said base portion and said opening of said primary valve, a seat portion coupled to and extending radially outwardly relative to said shaft portion on a second side of said primary valve opposing said first side, said seat portion being movable relative to said shaft portion to open and close said opening, and a top portion coupled to said seat portion and extending radially outwardly relative to the axis and adapted to couple a valve arm of the turbocharger between said seat portion and said top portion; and
a spring disposed between said primary valve and said secondary valve to seat said secondary valve against said primary valve, wherein relative small movement of the valve arm causes said secondary valve to move and open said opening to allow some of the exhaust gas of the turbocharger to escape through said opening without moving said primary valve relative to the valve seat.

15. A two-stage valve assembly for a turbocharger, said two-stage valve assembly comprising:
a movable primary valve adapted to open and close a valve seat of the turbocharger, said primary valve including a base portion extending radially outwardly from an axis and having a plurality of openings extending axially therethrough and a shaft portion extending from said base portion along the axis;
a movable secondary valve coupled to said primary valve to open and close said openings of said primary valve, said secondary valve including a seat portion coupled to and extending radially outwardly relative to said shaft portion and movable relative to said shaft portion to open and close said openings, and a top portion coupled to said seat portion and extending radially outwardly relative to the axis and adapted to couple a valve arm of the turbocharger between said seat portion and said top portion; and
a spring disposed between said primary valve and said secondary valve to seat said secondary valve against said primary valve, wherein relative small movement of the valve arm causes said secondary valve to move and open said opening to allow some of the exhaust gas of the turbocharger to escape through said openings without moving said primary valve relative to the valve seat.

16. A turbocharger for receiving exhaust gas from an internal combustion engine, said turbocharger comprising:
a turbine housing comprising a valve seat and defining a turbine housing interior;
a rotatable turbine wheel disposed within said turbine housing interior for receiving the exhaust gas; and
a two-stage valve assembly coupled to said valve seat and adapted to divert a portion of the exhaust gas away from said turbine wheel, said two-stage valve assembly comprising a movable primary valve to open and close said valve seat, said primary valve having at least one opening extending axially therethrough, a movable secondary valve coupled to said primary valve to open and close said at least one opening of said primary valve, and a spring disposed between said primary valve and said secondary valve to seat said secondary valve against said primary valve, wherein said secondary valve is coupled to a valve arm of the turbocharger such that relative small movement of the valve arm causes said secondary valve to move and open said at least one opening to allow some of the exhaust gas of the turbocharger to escape through said at least one opening without moving said primary valve relative to the valve seat.

17. A two-stage valve assembly for a turbocharger, said two-stage valve assembly comprising:
a movable primary valve adapted to open and close a valve seat of the turbocharger, said primary valve having at least one opening extending axially therethrough;
a movable secondary valve coupled to said primary valve to open and close said at least one opening of said primary valve; and
a spring disposed between said primary valve and said secondary valve to seat said secondary valve against said primary valve, wherein said primary valve has a groove extending circumferentially therein to seat one end of said spring in said primary valve, wherein said secondary valve is adapted to be coupled to a valve arm of the turbocharger such that relative small movement of the valve arm causes said secondary valve to move and open said opening to allow some exhaust gas of the turbocharger to escape through said at least one opening without moving said primary valve relative to the valve seat.

* * * * *